Aug. 14, 1945.  A. G. EMERY  2,382,784
METHOD OF MAKING FLEXIBLE CONTOUR MAPS
Filed Oct. 14, 1943
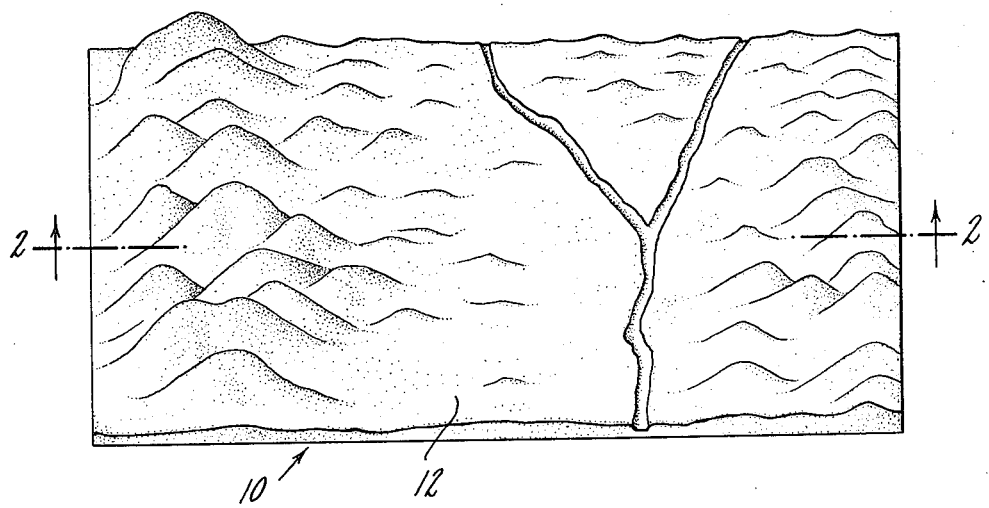
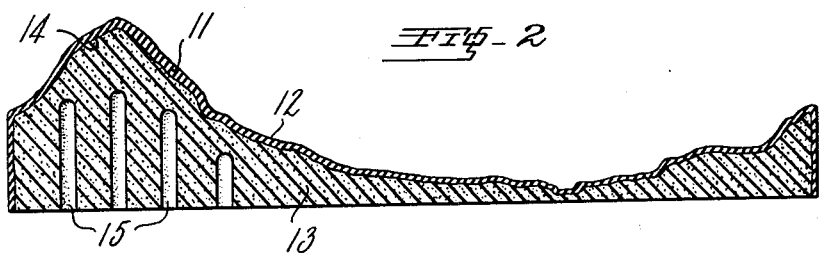
INVENTOR.
ALBERT G. EMERY
BY Lester J. Buollong
ATTORNEY Patented Aug. 14, 1945

2,382,784

UNITED STATES PATENT OFFICE 2,382,784

METHOD OF MAKING FLEXIBLE CONTOUR MAPS

Albert G. Emery, New York, N. Y., assignor to United States Rubber Company, New York, N. Y., a corporation of New Jersey Application October 14, 1943, Serial No. 506,217

2 Claims. (Cl. 18—61)

This invention relates to improvements in methods of making flexible contour maps.

The disadvantage of present contour maps made of a layer or shell of flexible, resilient material, such as rubber, is that the relative elevations on the map surface, particularly with large maps, cannot be held in accurate and undistorted relationship. For example, low sloping plains are badly distorted when the map is relaxed as when it is laid out on a table for use. Reinforcing the rubber shell, as with fabric layers, does not overcome the difficulty and increases the weight and stiffness undesirably. One method of holding a more or less true elevational relationship is to paste or otherwise affix accurately dimensioned blocks or shaped templates under the elevated portions of the map, but this is a cumbersome and far from satisfactory procedure.

By the present invention, there is produced an accurate flexible contour map in which the relative elevations of the contour are held in undistorted relationship when the map is in relaxed condition, and which can be rolled up and transported in small space with little weight.

In the accompanying drawing:

Figure 1 is a perspective view of a map according to the present invention looking from above, and Figure 2 is an elevation on line 2—2 of Fig. 1 showing constructional details of the map.

Referring to the drawing, the map 10 of the present invention comprises a layer of solid, flexible, resilient material 11, for example, rubber, the surface 12 of which has been molded against the surface of the negative mold and which comprises the face of the contour map. The face of the map may show mountains, rivers, plains, roads, trees, building groupings and the like. Colored designations may be applied to the surface 12 as by painting or spraying. The relative elevations on the face of the map are held in undistorted relationship when the map is in relaxed condition by a backing or reinforcement of cellular flexible, resilient material 13, for example, sponge rubber, secured to the inner surface 14 of the solid rubber shell or layer 11 opposite the surface 12 which comprises the face of the map. The sponge rubber permits tight rolling for shipping and is adapted to hold relative elevations of the contour on the face of the map in undistorted relationship when the map is in relaxed condition as when it is tabled.

The solid shell or layer 11 and the cellular backing 13 may be made of any flexible, resilient material, for example, natural rubber, synthetic rubbers such as neoprene (polychloroprene), Buna S (copolymer of butadiene and styrene), Buna N (copolymer of butadiene and acrylic nitrile), Butyl rubber (copolymer of isobutylene and isoprene), plastics of a more or less elastic nature, such as polyisobutylene, methyl acrylate and methyl methacrylate resins, polyvinyl esters such as polyvinyl acetate or polyvinyl chloride or copolymers of vinyl acetate and chloride, polyvinyl acetals such as polyvinyl butyral, ethyl cellulose and the like. The shell or layer 11 may be molded from the plasticized or softened material in the usual manner, and a conventional sponge 13 dry blown in a mold of the desired shape may be cemented to the surface 14 of the solid layer 11. However, it is preferred to deposit the layer 11 directly from an aqueous dispersion of the flexible, resilient material on the negative mold surface, and after solidification of the shell 11 to form the backing 13 by filling the shell with a foamed aqueous dispersion of the flexible, resilient material and drying to form a cellular or sponge backing. Latex is a natural dispersion of rubber. Artificial dispersions of the flexible, resilient materials as above exemplified are readily prepared by known procedures of plasticizing the material, mixing in a hydrophilic colloid, and adding water until the material becomes dispersed in the aqueous medium. Such dispersions are commercially available. For convenience, the manufacture of a rubber map as illustrated in the drawing will be discussed.

The mold may be of plaster, metal, or a plastic material made from a positive contour map such as a contour cartographers original or master plaster map. The solid rubber layer 11 may be formed against the mold surface in known manner as by spraying an aqueous dispersion of rubber against the surface and partially drying or setting the same. The aqueous dispersion of rubber may be flowed onto the negative mold surface and gelled or set by heat as in the case of a heat-sensitive dispersion. A coagulant on the form surface before application of the dispersion, or the simultaneous spraying of the dispersion and coagulant may be used to build up a shell of the desired thickness in reduced time. The rubber shell may be deposited from an aqueous dispersion of rubber against the surface of a porous mold in known manner. The thickness of the rubber layer is generally about $\frac{1}{16}$" up to $\frac{1}{2}$" for very large maps. The surface 12 of the solid rubber layer thus deposited directly from an aqueous dispersion of rubber against the mold surface will accurately reproduce the various configurations desired on the surface of the map by virtue of the fluidity of the dispersion before setting or gelling in place.

After the rubber layer 11 has been built up to the desired thickness in the negative mold by such a direct deposition process, and preferably before complete drying, a foam prepared from an aqueous dispersion of rubber, as by whipping in a known manner, is poured into the mold to fill the space within the solid rubber shell or layer 11. The foam may contain a sensitizing agent such as sodium silicofluoride so that after pouring into the mold it will readily set or gel to wet sponge rubber with or without application of heat, as in known foam sponge practice. The foam may completely fill the space inside the solid rubber shell 11, or if desired tubes may be extended into the foam before setting so that after setting, spaces such as at 15 will be formed which decrease the weight and permit easier collapsing of the map when rolled, but do not detrimentally effect the reinforcing properties of the sponge rubber backing. The gelled sponge backing may be dried and the drying of the shell 11 completed. The drying and vulcanization of the map as a whole will satisfactorily secure the sponge rubber backing 13 to the solid rubber layer 11 at the surface 14. If the rubber layer or shell 11 is dried completely before the foam is poured in, an adhesive may be sprayed on the surface 14 before pouring in the foam to assure that the foam sponge backing of the finished map will be adequately secured to the surface 14 of the solid rubber layer 11. The sponge rubber backing may be admixed with fibres, or reinforced with cord or fabric or the like if desired as in the case of very large maps.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of making a flexible contour map which comprises forming a shell having a surface in the desired configurations by the direct deposition of solids of an aqueous dispersion of flexible, resilient material on the surface of a mold, filling the space inside the thus formed shell with a fluid aqueous foam of flexible, resilient material, and drying, thereby forming a flexible contour map with a cellular reinforcement.

2. The method of making a flexible contour map which comprises forming a shell having a surface in the desired configurations by the direct deposition of solids of an aqueous dispersion of rubber on the surface of a mold, filling the space inside the thus formed shell with a fluid foam prepared from an aqueous dispersion of rubber, and drying and vulcanizing the whole, thereby forming a flexible contour map with a sponge rubber reinforcement.

ALBERT G. EMERY.